June 11, 1929.　　　J. A. WRIGHT　　　1,716,717
FRONT AXLE ASSEMBLY
Filed Dec. 8, 1927　　　2 Sheets-Sheet 1

INVENTOR.
JAMES A. WRIGHT.
By
ATTORNEY.

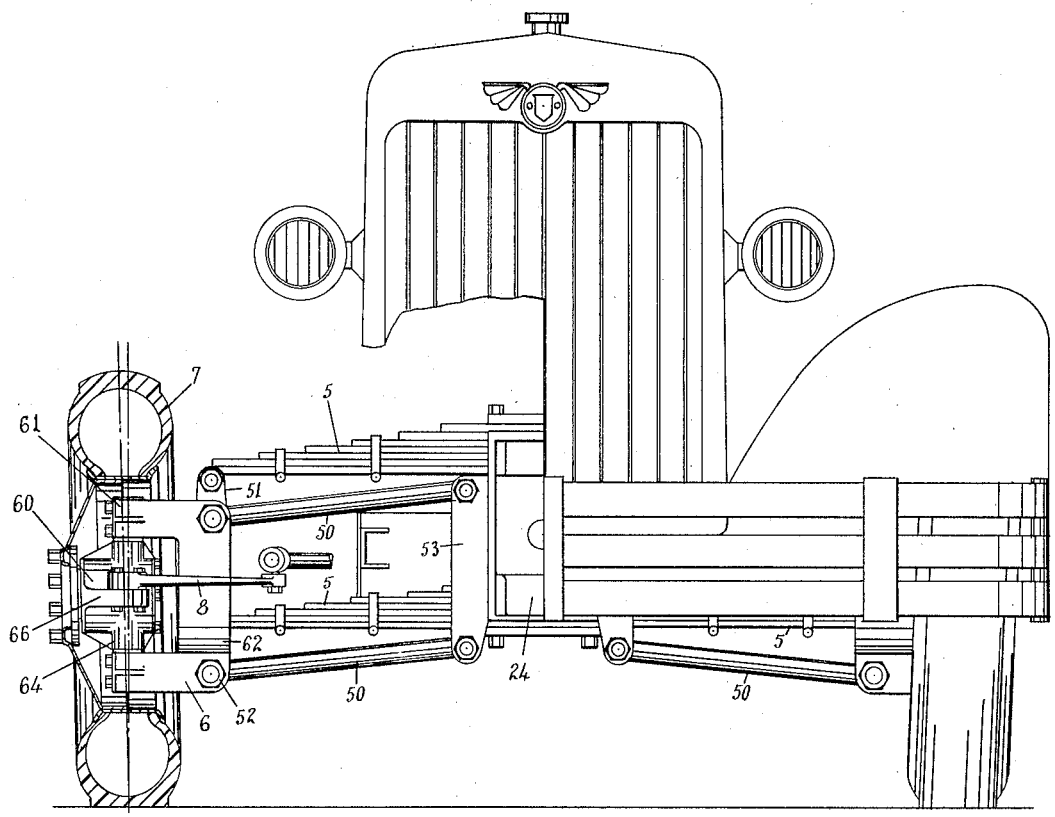
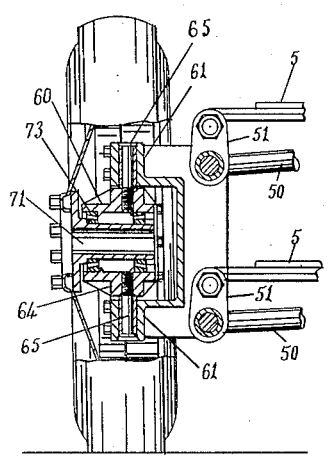
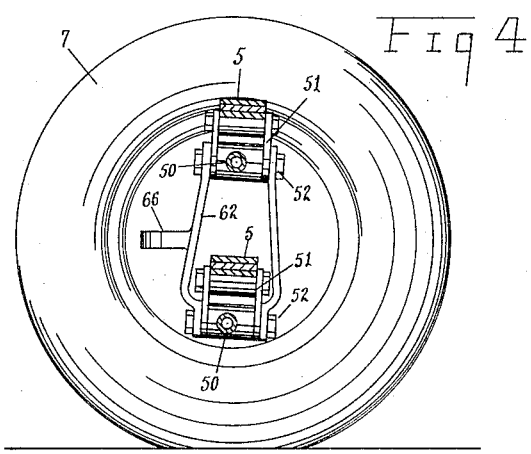

Patented June 11, 1929.

1,716,717

UNITED STATES PATENT OFFICE.

JAMES A. WRIGHT, OF MONTREAL, QUEBEC, CANADA.

FRONT-AXLE ASSEMBLY.

Application filed December 8, 1927. Serial No. 238,681.

This invention relates to the front axle assembly of motor vehicles and particularly those equipped with flexible axle suspension.

Its object is to provide an improved wheel carrier and wheel mounting thereon, with shackles coupled to the transverse springs.

A further object is to provide an improved steering lever anchorage within the wheel.

The invention consists in a forked wheel carrier pivoted vertically to a horizontal sleeve in which the stub axle of the wheel is journalled, with vertical ribs in which the spring shackle bolts are journalled.

A bracket projecting from one side of the sleeve forming the anchorage of the steering lever.

Reference is made to the accompanying drawings in which,

Fig. 2 is a front view partly cut away.

Fig. 3 is a vertical section through the axis of the wheel.

Fig. 4 is a view of the wheel carrier from the inside.

Figure 1:
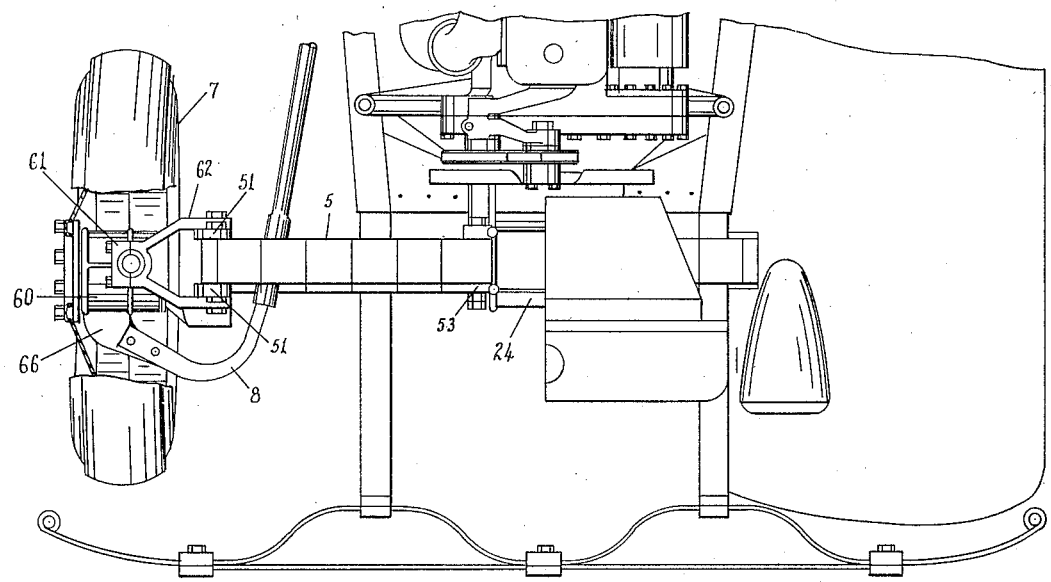
Fig. 1 is a plan view partly cut away.

The transverse springs 5, are secured in seats in the yoke block 24, and at their ends are coupled to the shackles 51, pivoted on bolts 52, through bearings in the ribs 62, of the wheel carrier 6.

The radius rods 50, are pivoted on brackets 53, projecting from the yoke block 24, at one end, and have transverse sleeves at the other end which are journalled on the bolts 52, within the shackles 51.

The forks 61, of the wheel carrier 6, house the vertical pivot pins 65, which are screwed into the sleeve 60, above and below, in vertical bosses 64.

The stub axle 71, of the wheel 7, is journalled in roller bearings 73, in this sleeve 60.

Projecting from the inner end of the sleeve 60, on one side, is a bracket 66, to which the steering lever 8, is rigidly secured.

With this construction the wheel and sleeve pivot on the pins journalled in the forks of the wheel carrier, and are controlled by the steering lever and the anchor bracket on the sleeve.

The radius rods maintain the wheel carrier parallel to the yoke block.

What I claim is:—

1. In a front axle assembly having transverse spring suspension, a wheel carrier with forks, a wheel having a stub axle journalled in a sleeve, vertical pivot pins projecting from the sleeve and journalled in the forks of the wheel carrier, and vertical ribs projecting from the wheel carrier to provide bearings for the terminals of the spring suspension.

2. In a front axle assembly having transverse spring suspension, a wheel carrier with forks, a wheel having a stub axle journalled in a sleeve, vertical pivot pins projecting from the sleeve and journalled in the forks of the wheel carrier, and vertical ribs projecting from the wheel carrier to provide bearings for the bolts on which shackles coupled to the ends of the spring suspension are mounted.

JAMES A. WRIGHT.